United States Patent [19]
Begun et al.

[11] Patent Number: 5,459,842
[45] Date of Patent: Oct. 17, 1995

[54] SYSTEM FOR COMBINING DATA FROM MULTIPLE CPU WRITE REQUESTS VIA BUFFERS AND USING READ-MODIFY-WRITE OPERATION TO WRITE THE COMBINED DATA TO THE MEMORY

[75] Inventors: Ralph M. Begun, Boca Raton, Fla.; Paul W. Browne, Underhill Ctr., Vt.; Marc R. Faucher, South Burlington, Vt.; Gerald L. Frank, Essex Jct., Vt.; Christopher M. Herring, Westford, Vt.

[73] Assignee: International Business Machines Corporation, Armonk, N.Y.

[21] Appl. No.: 905,259

[22] Filed: Jun. 26, 1992

[51] Int. Cl.[6] .................................................. G06F 13/14
[52] U.S. Cl. ............... 395/250; 395/482; 395/494; 395/481; 395/888; 364/252.3; 364/252.6; 364/252.7; 364/DIG. 1
[58] Field of Search ........................ 395/250, 425, 395/325; 365/189.01, 189.05, 230.01, 230.08

[56] References Cited

U.S. PATENT DOCUMENTS

| | | | |
|---|---|---|---|
| 4,287,577 | 9/1981 | Deal, Jr. | 365/233 |
| 4,742,474 | 5/1988 | Knierim | 364/521 |
| 4,805,098 | 2/1989 | Mills, Jr. et al. | 364/900 |
| 4,905,188 | 2/1990 | Chuang et al. | 364/900 |
| 5,235,545 | 8/1993 | McLaury | 365/189.04 |
| 5,235,693 | 8/1993 | Chinnaswamy et al. | 395/425 |
| 5,357,622 | 10/1994 | Parks et al. | 395/425 |

FOREIGN PATENT DOCUMENTS

| | | |
|---|---|---|
| 55-63453 | 5/1980 | Japan . |
| 59-22278 | 2/1984 | Japan . |
| 61-123957 | 6/1986 | Japan . |

OTHER PUBLICATIONS

L. Johnson et al, "Improved Video RAM Read Transfer Cycle", IBM TDB Jun. 1991, pp. 479–480.
R. J. Bowater et al, "Techniques for Dynamic RAM Bandwidth Utilization", IBM TDB Dec. 1984, pp. 4544–4545.

*Primary Examiner*—Thomas C. Lee
*Assistant Examiner*—Le Hien Luu
*Attorney, Agent, or Firm*—Robert S. Babayi

[57] ABSTRACT

A write compression buffer is connected to a CPU bus and to a memory controller to provide write cycle compression in which plural partial write requests to the same memory address are compressed into a single memory write cycle. The buffer has a plurality of buffering level.

17 Claims, 11 Drawing Sheets

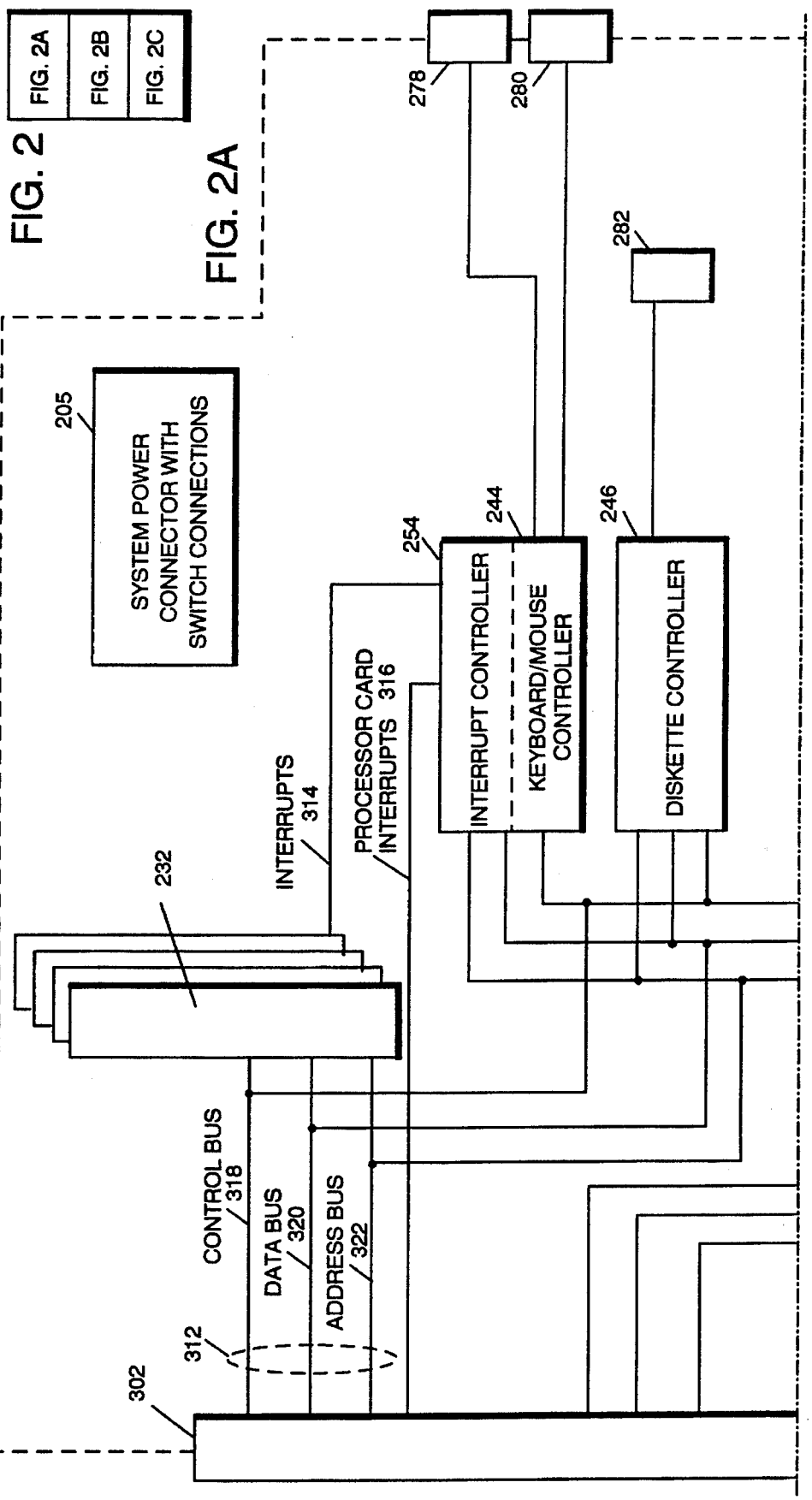

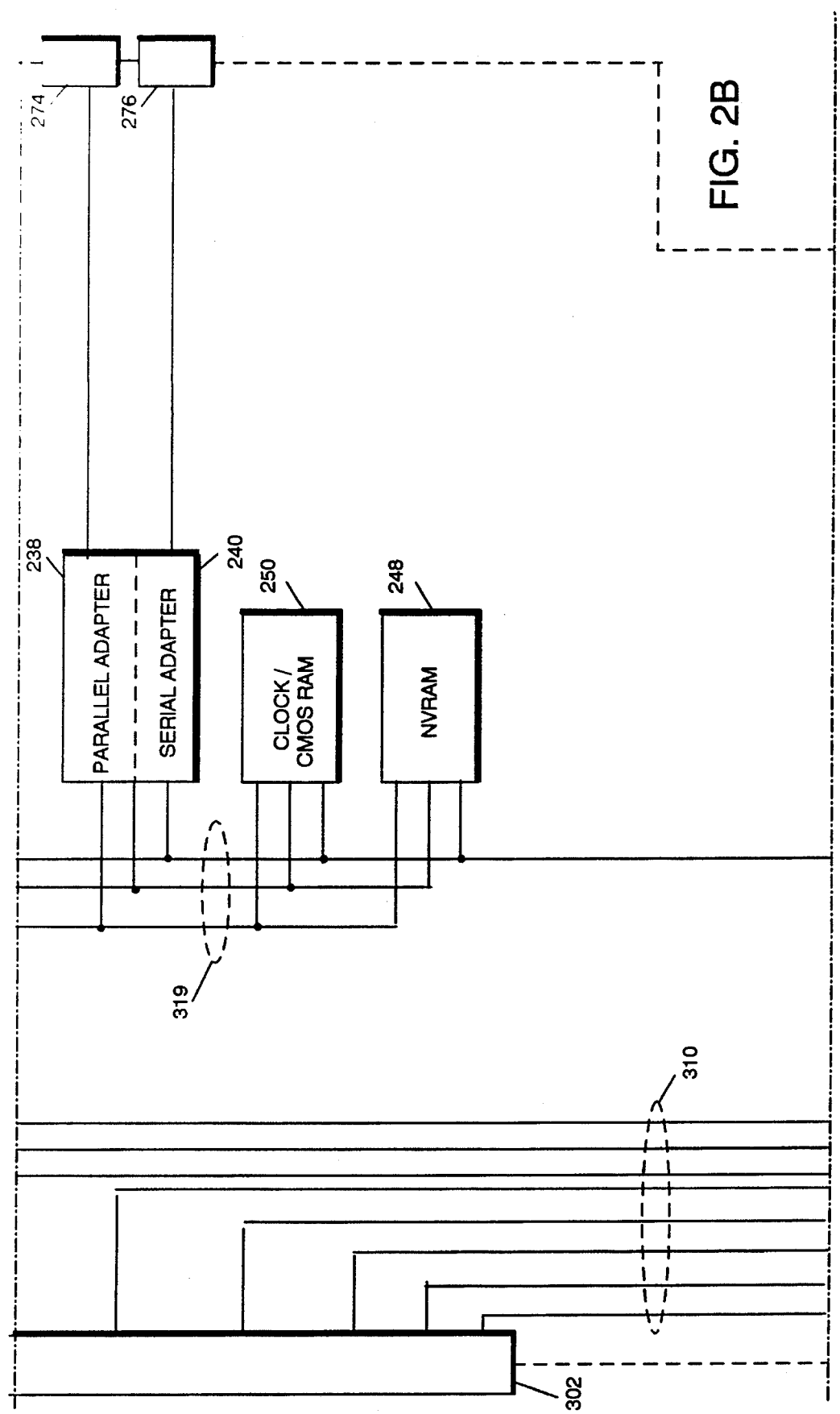

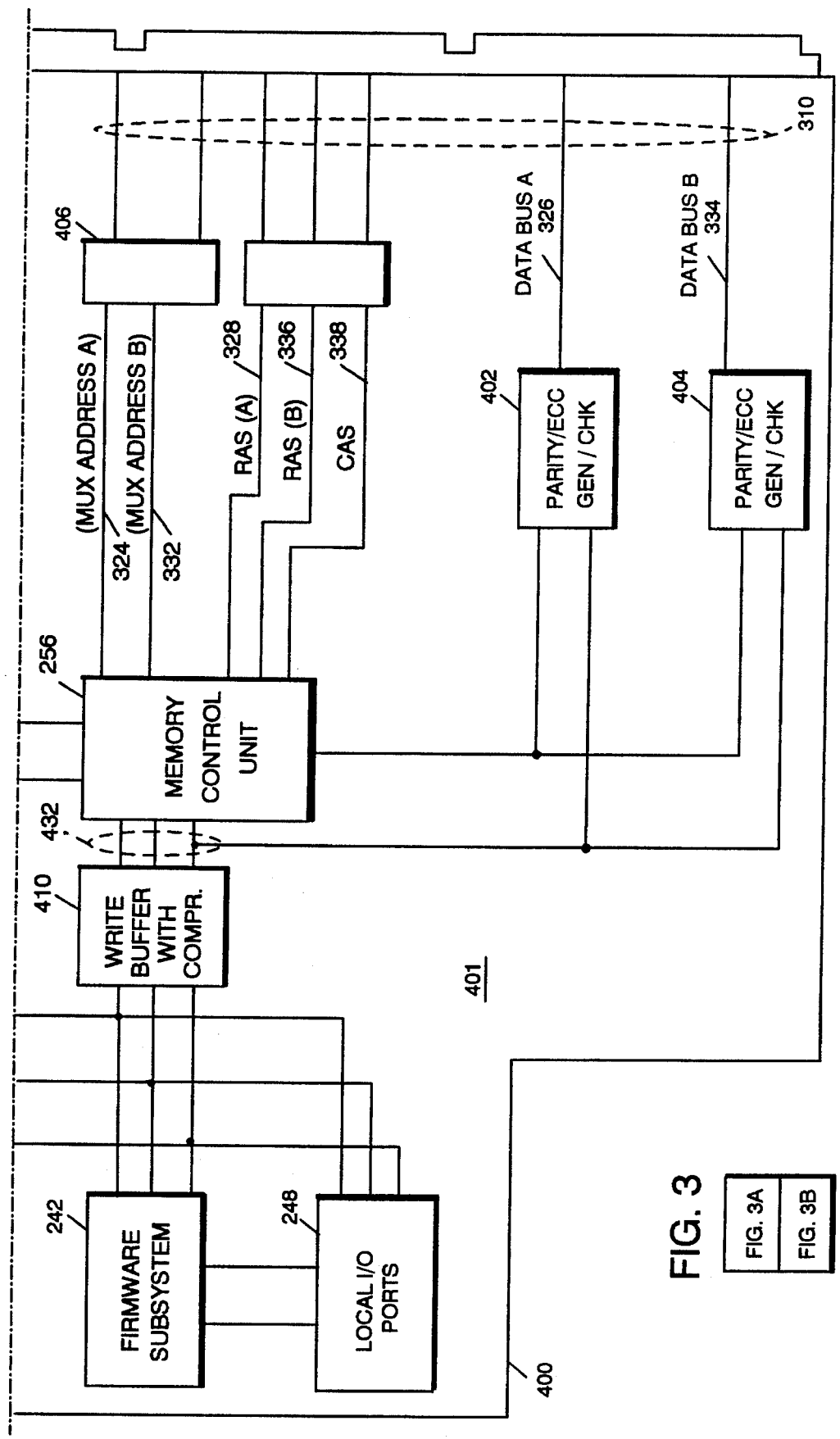

SYSTEM FOR COMBINING DATA FROM MULTIPLE CPU WRITE REQUESTS VIA BUFFERS AND USING READ-MODIFY-WRITE OPERATION TO WRITE THE COMBINED DATA TO THE MEMORY

RELATED APPLICATION

U.S. patent application Ser. No. 07/861,219, filed Mar. 31, 1992 by R. Bealkowski et al, for "SELECTABLE PROGRAMMABLE FIRMWARE STORE FOR A PERSONAL COMPUTER SYSTEM", and assigned to the assignee of this application, discloses a system which can be modified to incorporate the invention of this application.

BACKGROUND OF THE INVENTION

In high speed personal computers, system performance may be limited in part by the execution time of CPU write cycles. This is especially apparent in systems employing error correcting code (ECC) memories. Overall system performance is affected to a large degree by the performance of its memory subsystem. A memory subsystem comprises two major elements, a memory controller and a main memory. A microprocessor or CPU, initiates bus cycles to the memory controller. These bus cycles can include both data read and data write requests. For CPU read cycles, the CPU must wait for data to return from the main memory before continuing execution. For write cycles, the CPU must wait for the memory system to complete writing data into memory.

Performance is limited in part by the time delay inherent in reading data from and writing data to the memory. This limitation becomes readily apparent with modern processors running at 50 Mhz and above. Some modern processors use integrated store-through caches in order to optimize performance. These caches can provide read data to the processing core of the microprocessor in an expeditious manner for read cycles. When this is done, write cycle performance tends to dominate and limit the overall system performance.

One prior art performance enhancement employed by some systems is a write buffer. A write buffer is a block of logic positioned between the processor and the memory system. The write buffer is capable of storing one or more complete processor write cycles. Processor write cycles include address, data, and control information. Write buffers operate by first capturing the cycle information in buffers and then signalling the microprocessor that the write cycle is complete. The write buffer then acts to complete the cycle to the remainder of the system. Write buffers enhance performance by signalling the microprocessor that the write cycle is complete sooner than would normally be possible. The write buffer then appears to the remainder of the system like the processor itself, and waits for the buffered cycle to complete. In the meantime, the microprocessor is free to complete further internal operations, which are possibly assisted by the internal cache as previously discussed.

Write buffers can include the capability to buffer more than one write cycle at any given time and thereby improve system performance in cases in which the microprocessor requires that several write cycles be completed before continuing to the next read operation. Write buffers, however, can only provide limited improvement to processor performance. Read cycles to main memory must be delayed until any write buffer contents are completely stored into main memory. Sequential write cycles, beyond the depth of any given write buffer, must also wait to complete until space becomes available in the write buffer. Consequently, systems employing write buffers may still be limited by the performance of write cycles.

Currently, error correcting code (ECC) memory subsystems are being introduced into personal computer systems. These memory subsystems use an error correcting code word that is stored along with required processor data. ECC memory subsystems improve system reliability by detecting and correcting single bit memory errors. The ECC code word is calculated on the basis of a selected atomic unit of data. In PS/2 personal computer systems, this code word is calculated on the basis of a 32-bit wide data word, and requires 7-bits for code storage. However, most personal computer software is written to operate on 8-bit or 16-bit processors. Consequently, even though many new systems employ 32-bit processors, a large number of read and write cycles occur as 8 or 16 bit operations. These cycles are referred to here as "partial write cycles", in that the size of the write data is less than the size (32 bits) of the minimum ECC memory atomic data unit. When the microprocessor executes a write of less than an atomic memory unit, the memory subsystem must execute a special read-modify-write (RMW) or partial write cycle.

During a RMW cycle, the CPU transmits bus definition signals along with the data to be written and the address where the data is to be written. Such bus definition signals indicate a write cycle for data having less than 32 bits. Thirty two bits of data along with ECC correction code are then read from the main memory at such address. The data (8, 16, or 24 bits) to be written is merged with old data read from the addressed location to form a new 32-bit word. A new 32 bit word correction code is calculated and the resultant new 32 bit word with code is written into main memory.

Such complex cycle is required in order to maintain relevant correction code storage information at each atomic memory address. In an ECC memory system, the wait time for write cycles becomes more pronounced when a partial write cycle occurs and the memory controller must execute both a main memory read and a main memory write for a single processor operation.

In summary, system performance in high speed personal computers is limited in large part by the speed at which write cycles occur into main memory. This limitation is more pronounced in systems employing ECC memory, whenever a large percentage of partial writes occur, since these partial write cycles are relatively lengthy cycles.

SUMMARY OF THE INVENTION

The invention takes advantage of the tendency of personal computer microprocessors, as viewed on the CPU local bus, to issue a large number of sequential write cycles to memory addresses that are closely associated. During the routine operation of personal computer systems, there are many situations in which multiple consecutive partial write cycles are made to sequential addresses. For example, in the situation of program subroutine entries, many program environment parameters must be stored (written into memory) so that they may later be recalled. These writes are typically stored in a specific area of memory reserved for this purpose. Another exemplary situation in which consecutive sequential write cycles occur is when data fields are saved, such as when a document or spreadsheet data is stored.

Programs that produce write cycles intended to run on 8-bit or 16-bit personal computer systems, can be executed on microprocessors of 32-bit or greater data width. The execution of such programs results in a large number of write cycles of 8-bit or 16-bit width occurring on the wider CPU local bus. When these cycles occur in an ECC memory subsystem, then they result in the previously described read-modify-write (partial write) memory operations.

In accordance with the invention, the execution of partial write cycles can be speeded up by compressing two consecutive write cycles to two different sub-units of any given atomic memory unit, into a single write access to that single atomic memory address. Any two such microprocessor accesses, as seen on the CPU local bus, that result in a single read-modify-write or single write access as seen at the DRAM memory, are said to be compressed. "Compression" refers to combining multiple bus operations on one bus into fewer bus operations on another bus, as opposed to the modification of specific data fields. For example, if a 16-bit write from the microprocessor is followed by another 16-bit write to the same address, the two write cycles can be compressed to form one 32-bit memory write. This turns two partial write cycles, which are two read-modify-write cycles (previously seen at the memory as two read and two write operations), into one read-modify-write cycle at the memory. Similarly, four 8-bit partial writes could be converted to as few as one 32-bit write.

In the preferred embodiment, the unit of atomic memory storage is 32-bits. The term 'same address' is used here to mean any address that refers to a particular 32-bit storage location in memory. Each 32-bit location comprises four different bytes of data. These four different bytes of data could be accessed, for example, as four separate byte operations, or as a single double byte and two single byte operations, or as two separate double byte operations, or as a single 32-bit double word. Memory accesses as initiated by a microprocessor in the preferred embodiment are comprised of a 32-bit address field, a 32-bit data field, and a control field. This address field includes in part four byte enable lines. A byte refers to an 8-bit data field. When active, these byte enables indicate which of the four bytes on any given bus access are designated as active by the system microprocessor. One or more of these byte enables are active on any given cycle.

In a system employing ECC memory, assuming the memory controller is idle, a partial write cycle issued by the microprocessor results in a RMW cycle at the memory. The memory controller begins by initiating a read access to the required address. While this read cycle occurs, subsequent partial writes to the same address can be compressed, until such a time as the read portion of the RMW cycle is finished. This can change two 16-bit RMW cycles into one RMW cycle or four 8-bit RMW cycles into one RMW cycle.

One of the objects of the invention is to provide an improved write buffer for increasing the performance of a personal computer system.

Another object of the invention is to provide an improved write buffer which compresses plural write cycles as seen on CPU bus into a single memory cycle as seen on a memory bus.

A further object of the invention is to provide a high speed write cycle compression particularly suitable for an ECC memory system.

Briefly, in accordance with the invention, a write buffer is connected to a CPU bus and to a memory controller to provide write cycle compression in which plural partial write requests cause data, address and control information to be buffered. A signal is returned to the CPU for each request indicating the write is complete. The write buffer compresses plural requests to the same address into a single memory write operation containing merged data from the plural requests.

DRAWINGS

Other objects and advantages of the invention will be apparent from the following description taken in connection with the accompanying drawings wherein.

DETAILED DESCRIPTION

PERSONAL COMPUTER SYSTEM

Figure 1:
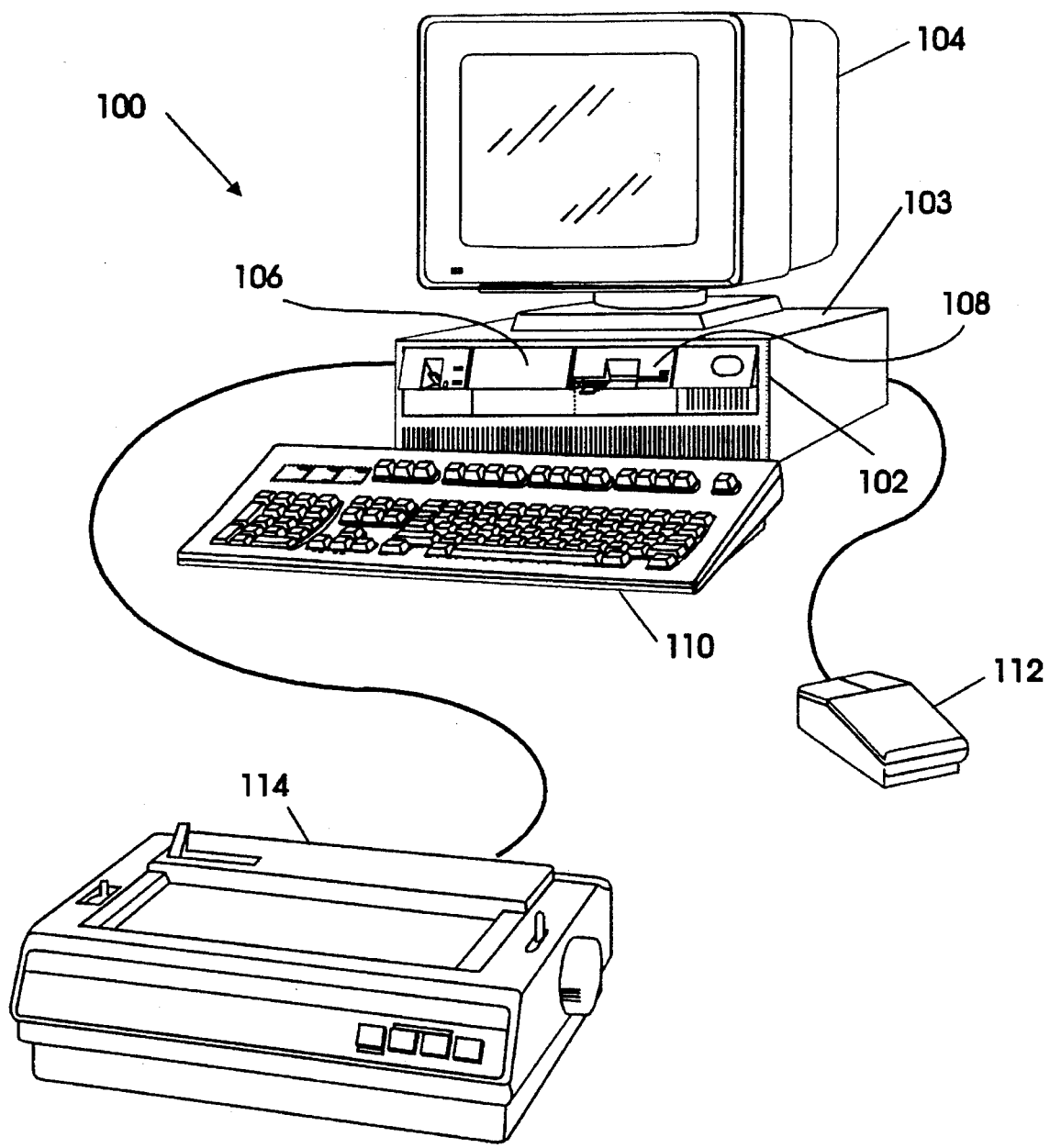
FIG. 1 is a schematic diagram of a data processing system embodying the invention.

Referring now to the drawings, and first to FIG. 1, a personal computer system 100 is substantially similar to the system disclosed in the above related application. System 100 comprises a system unit 102 having a suitable enclosure or casing 103, a monitor 104 (such as a conventional video display), a keyboard 110, an optional mouse 112, and an optional printer 114. Finally, system unit 102 may include one or more mass storage devices such as a diskette drive 108 and a hard disk drive (hardfile) 106.

Figure 2C:
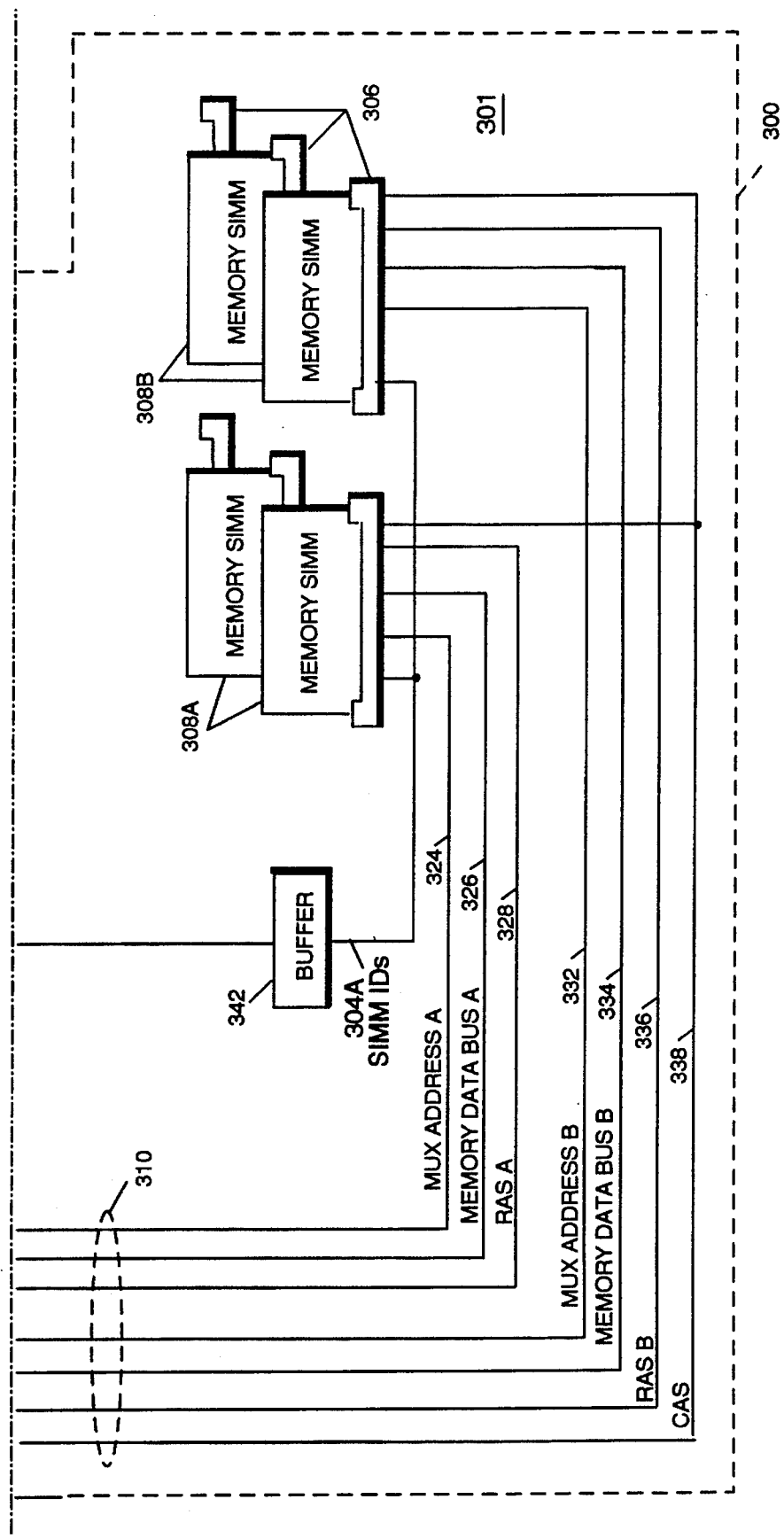
FIG. 2 is a schematic view of a planar board included in the system shown in FIG. 1.
Figure 3A:
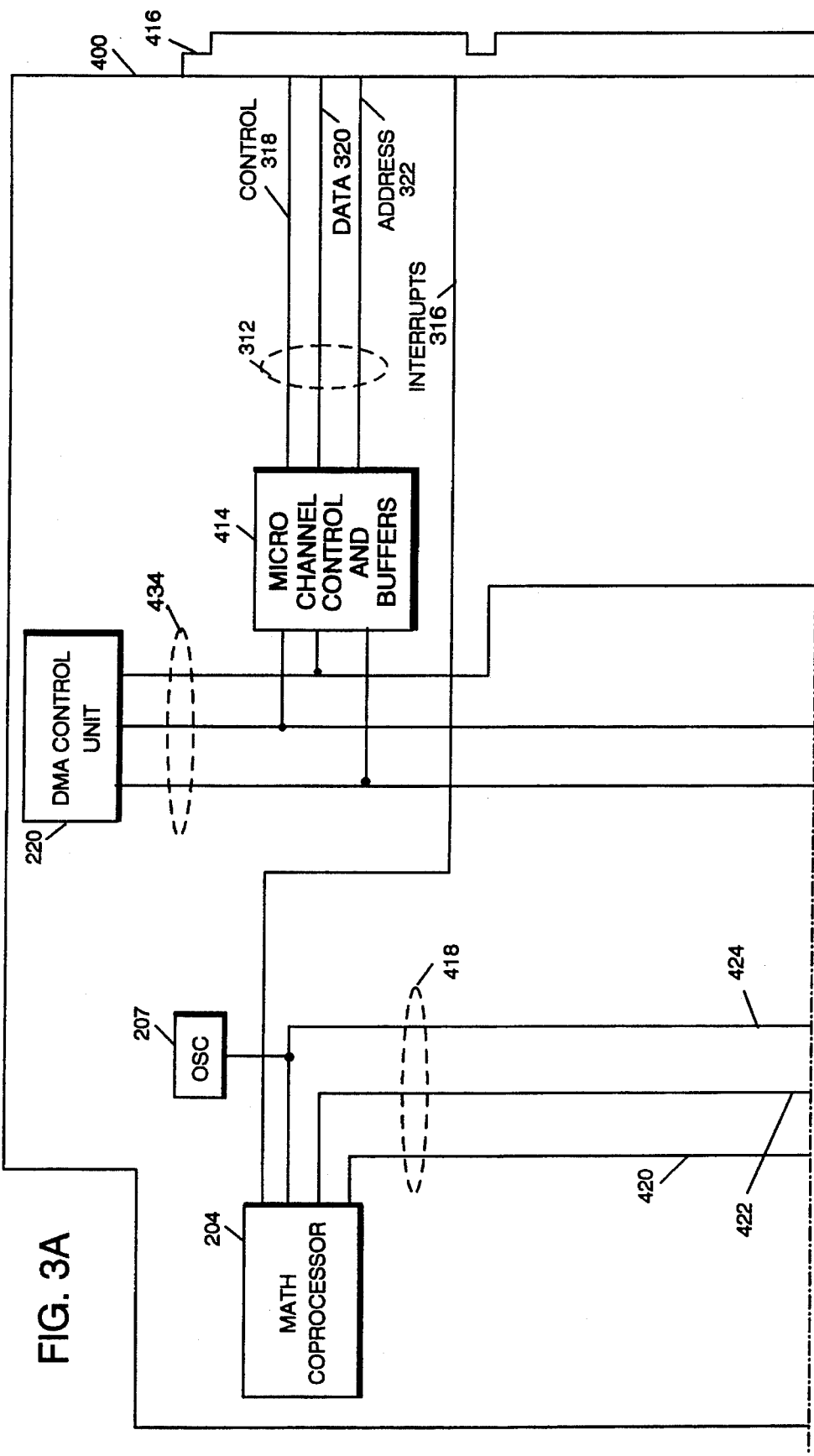
FIG. 3 is a schematic view of a processor card connectable to the planar board shown in FIG. 2.

Casing 103 houses a planar board 300 and a processor card 400 the details of which are shown in FIGS. 2 and 3. Planar board 300 comprises a printed circuit board (PCB) 301 upon which are mounted various components that are interconnected by wiring or circuits in the PCB. Such components include an electrical connector 302 into which an edge 416 of processor card 400 is plugged for removably mounting and electrically connecting processor card 400 to planar board 300. A plurality of single in-line memory module (SIMM) connectors 306 is also mounted on PCB 301 for connecting to memory banks 308A, 308B forming the system main memory or RAM. One or more I/O bus or expansion connectors 232 are also mounted on PCB 301 for connection to different expansion adapters and options that may be added or incorporated into personal computer system 100. For example, fixed disk drive 106 may be connected to an adapter card (not shown) having a disk controller which is connected to a connector 232.

Also mounted on planar board 300 are an interrupt controller 254 and a keyboard/mouse controller 244 which are connected to keyboard and mouse connectors 278 and 280, a diskette controller or adapter 246 connected to a diskette connector 282, and serial and parallel adapters 240, 238 connected to serial and parallel connectors 276, 274 which allow various I/O devices to be connected into the system. A system power connector 205 is mounted on PCB 301 for connection to a power unit (not shown) that supplies the necessary power for the system. A nonvolatile memory (NVRAM) 248 and a time-of-day clock/CMOS RAM 250 are also mounted on PCB 301. PCB 301 also has mounted thereon various oscillators (not shown) to provide timing signals, and buffers 342 (not all shown) to isolate sections of the circuitry in a manner well known.

The wiring of PCB 301 interconnects the various components as shown in the drawing and is grouped into three groupings, a memory bus 310 (including lines 324–338), a channel bus 312 (including an address bus 322, a data bus 320 and a control bus 318), and miscellaneous signal lines including interrupt lines 314, 316, all of which are connected to counterpart wiring on PCB 401 through the connectors 302, 416. Tapped off bus 312 is a planar function bus 319.

Referring to FIG. 3, processor card 400 comprises a printed circuit board (PCB) 401 having mounted thereon a plurality of components including a processor 202, a direct memory access (DMA) control unit 220, a Micro Channel control and buffer 414, a compression write buffer 410, a dual port memory control unit or controller 256, a firmware subsystem 242, and parity/ECC checking units 402, 404. Processor 202 preferably is a high performance type, such as an Intel 80486 microprocessor, having thirty-two bit data paths and providing thirty-two bit addressing capability. Of course, Intel 80386 and like processors can be used. The remaining components are selected in conventional fashion for their compatibility with such processor. All of the above components are electrically connected to each other as appropriate by printed wiring circuits in PCB 401 which terminate at edge connector 416. Edge connector 416 is normally plugged into edge connector 302 on planar board 300 shown in FIG. 2 so that planar board 300 and processor card 400 are electrically and mechanically interconnected and lie in planes oriented substantially perpendicularly to one another.

The wiring circuits of PCB 401 include a local or CPU bus 418 including data, address and control lines or busses 420, 422, 424, respectively, which interconnect processor 202 with firmware subsystem 242, local I/O ports 248, and write buffer 410. The remaining circuit lines generally include interrupt lines 316, system bus lines 434, memory controller bus lines 432 connected between buffer 410 and controller 256 and logic 402, 404, channel bus lines 312 and memory bus lines 310. Channel bus lines 312 include control, data and address bus lines 318, 320, 322, respectively. Memory bus lines 310 include multiplexed memory address lines 324, 332, row address strobe (RAS) lines 328, 336 for memory banks 308A, 308B, column address strobe (CAS) line 338, and data bus A and B lines 326 and 334. An oscillator 207 is connected as shown for providing suitable clock signals to computer system 100. For simplicity, certain miscellaneous lines, such as reset, grounds, power-on, etc. have been omitted from FIGS. 2 and 3. Also, the remaining elements shown in these figures operate in the manner described in the related application to which reference may be had for details thereof. It is to be noted that system 100 as described thus far is the same as that disclosed in the above related application except for compression write buffer 410.

The logic shown in FIGS. 2 and 3 supports either ECC or parity DRAM memory devices in SIMM sockets 308A, 308B. In ECC mode, memory cycles originate at processor 202 as data read or write requests. In the case of a read request, CPU 202 signals memory control unit 256 (via a fastpath in 410 described below) that a data read memory cycle is desired. Unit 256 then generates the appropriate DRAM control signals on 324, 332, 328, 336, and 338 to create the read of an atomic memory unit to appear on memory data bus 326 or 334 dependent on the address. The memory data on bus 334, for instance, contains 32-data bits and 7-ECC check bits. Unit 404 processes these 39-bits in a manner well known, such that it can present on the data portion of bus 432, thirty two valid data bits that have been checked against the original bus 334 data and had single bit errors (any one of bus 334) corrected. The data as corrected is then presented back to CPU 202 via bus 420.

In the case of a partial write cycle, CPU 202 originates a data write cycle of less that 32-bits. In such cycle, the valid data bytes are presented to circuits 402, 404 via bus 420 and buffer 410. The memory control unit 256 at this time recognizes that a partial write has been requested and initiates a RMW cycle. A full atomic unit is read into 402, 404. After checking and correcting as necessary the memory data from 326, 334, logic 402 or 404 merges the valid CPU bytes from bus 432 with the remaining valid memory data. Then logic 404 generates a new 7-bit check code and presents it on bus 334 along with the merged data. Unit 256 then generates the required DRAM control signals to write the full 39-bits into the DRAM.

COMPRESSION WRITE BUFFERING

Figure 4:
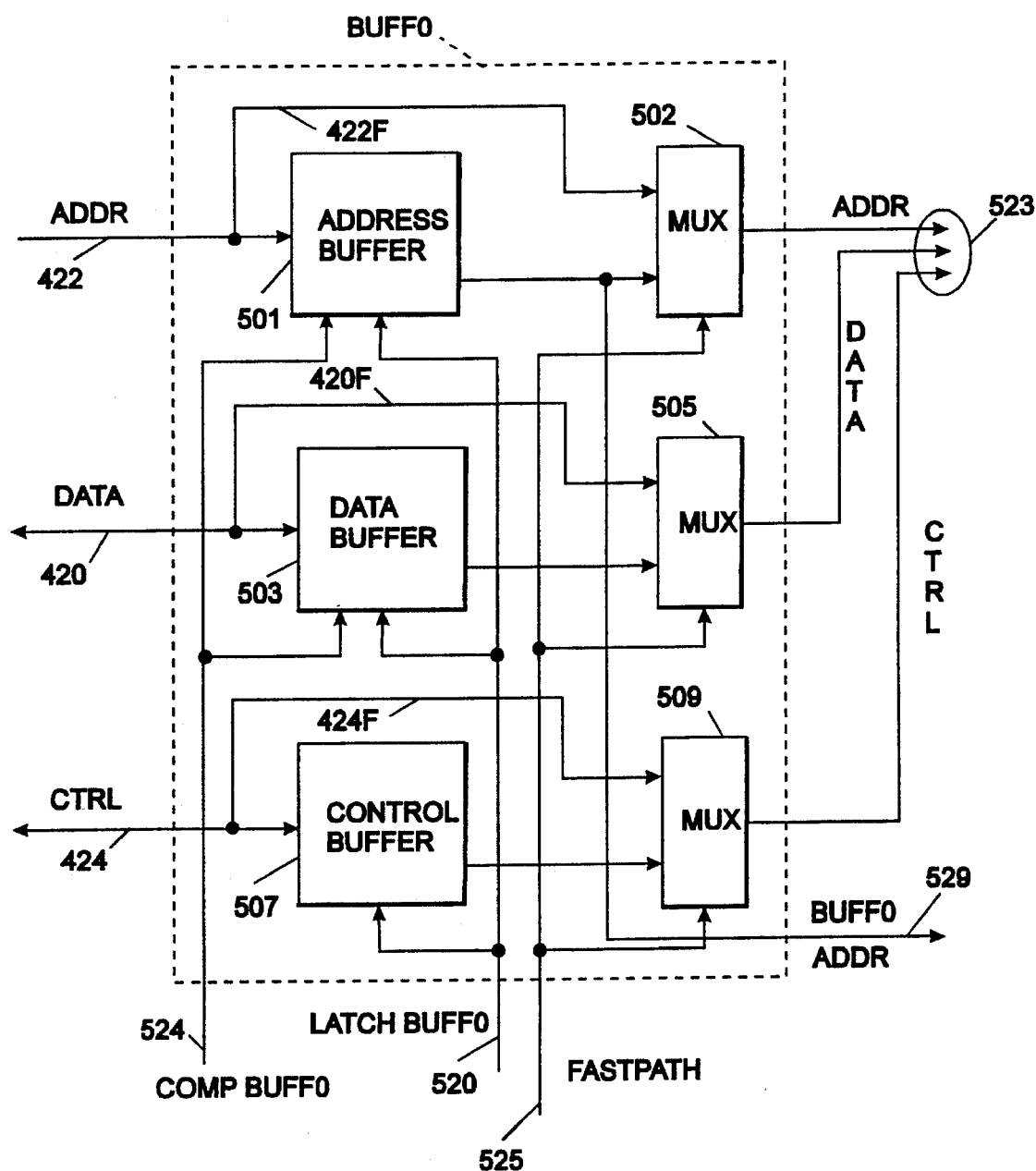
FIG. 4 is a schematic block diagram of a write buffer with compression shown in FIG. 3.

Compression write buffer 410 has one side connected to local bus 418, while a second side is connected to memory control bus 432 whereby buffer 410 is connected between processor 202 and controller 256 by busses 418 and 432. Compression write buffer 410 contains a plurality of single write buffers 630, 631 (FIG. 5) which are identical so that only one need be described in detail. Referring to FIG. 4, a single write buffer BUFF0 comprises three primary latching buffers: an address buffer 501, a data buffer 503, and a control buffer 507. These three buffers are each of sufficient width to latch the local bus address, local bus data, and local bus control signals, respectively from local address bus 422, local data bus 420, and local control bus 424. The output or latched sides of these latching buffers are connected to first inputs of multiplexers (MUXes) 502, 505, and 509. A plurality of fastpath busses 422F, 42OF, 424F bypass buffers 501, 503, and 507 and are connected to second inputs of the multiplexers. The multiplexers have outputs connected to a buffer bus 523. The multiplexers select signals on either of the two input busses to be presented on their outputs, which selection is made in accordance with the status of a control signal on line 525. The selection of the bypass path is used to transmit the bus information rapidly over bus 523 to memory controller bus 432 on read cycles during which the write buffer latches are not used. During write cycles, the signal on line 525 is used to enable compression by connecting the buffers to the controller bus. The latching of buffers 501, 503, 507 is controlled by a latch control signal LATCH BUFF0 on line 520. A bus 529 is also connected to the outputs of address buffer 501 and supplies the address BUFF0 ADDR latched in buffer 510. Additionally a control line 524 is connected to data buffer 503 for transmitting thereto a control signal COMP BUFF0 which causes data in partial writes to be merged into data already in buffer 503 in accordance with byte enable signals CPUBE$ identifying the bytes to be merged.

Figure 5:
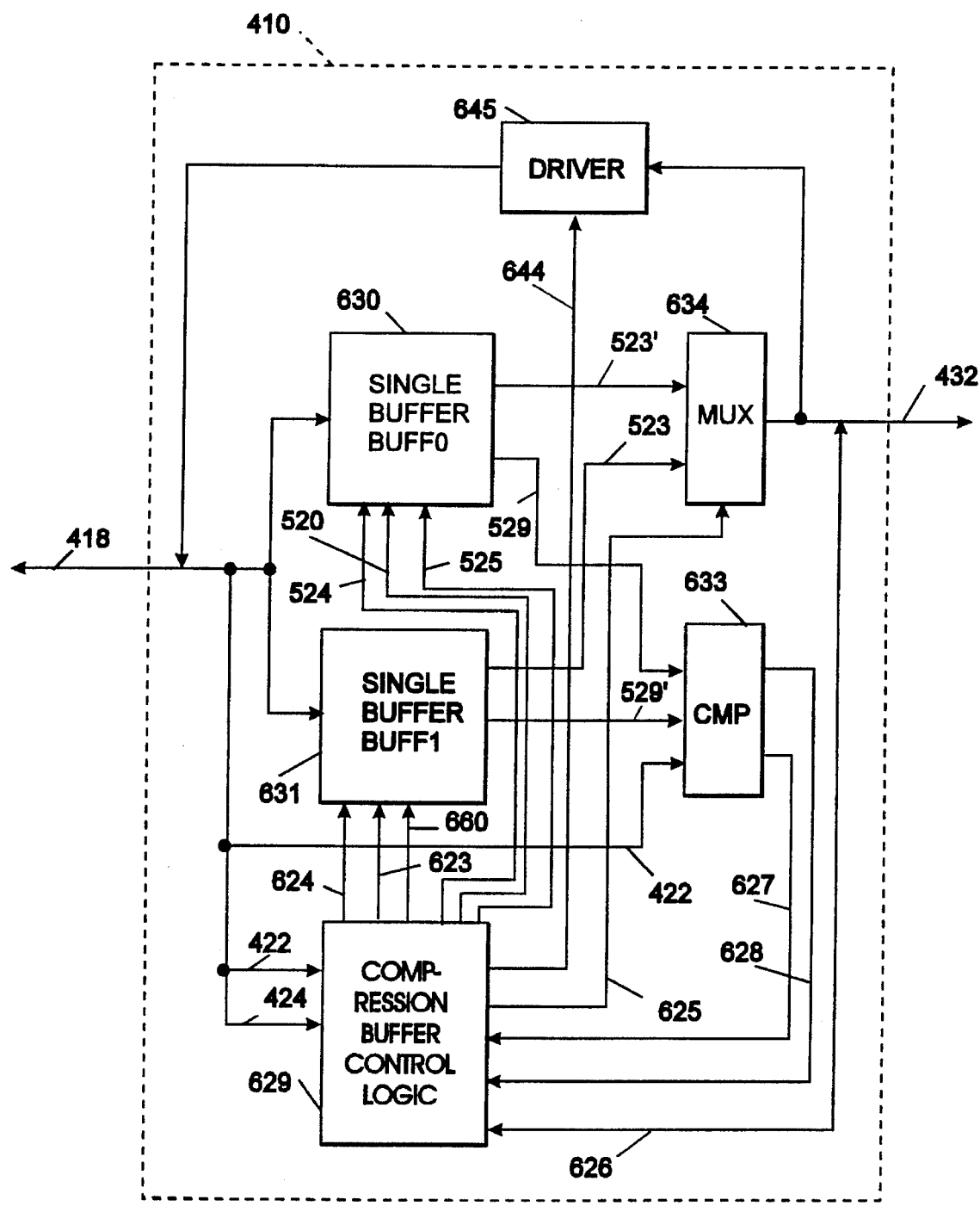
FIG. 5 is a schematic block diagram similar to FIG. 4 illustrating an alternate form of write buffer.

FIG. 5 shows a block diagram of the full embodiment of compression write buffer 410. Two single write buffers 630 and 631, are connected in parallel to local bus 418 and to a MUX 634. Buffers 630 and 631 are also designated BUFF0 and BUFF1, each buffer being the same as BUFF0 of FIG. 4. Of course, any number N of individual buffers may be used. MUX 634 also has a control input connected to logic 629 by a line 625 for receiving a control signal defining which buffer is connected to bus 432. The output of MUX 634 is connected to memory control bus 432. The control signal on line 625 is operative to selectively connect either buffer 630 or buffer 631 to bus 432. Connecting buffers 630 and 631 in parallel allows each buffer to monitor the CPU bus. During compression, instructions do not have to be sequential. Any buffer can be compared to any other buffer in a parallel structure. Therefore, compression can take place on non-sequential writes.

A driver 645 has inputs connected to bus 432 and outputs connected to bus 418 to provide a path for outputs of the memory controller to be driven onto local bus 418. Remember that busses 418 and 432 are both bi-directional. Driver 645 has no specific write compression function. Driver 645 is operated under the control of logic 629 by a control signal transmitted on line 644.

A comparator (CMP) 633 is respectively connected to the latched address portions of buffers 630 and 631. In addition the comparator is connected to local address bus 422. The function of comparator 633 is to compare the current local address on 422 with the latched addresses in BUFF0 and BUFF1. The comparator then provides two outputs; MATCH 0 indicating a match between the local address and the latched BUFF0 address, and MATCH 1 indicating a match between the local address and the latched BUFF1 address. Such signals are supplied on lines 627 and 628 to control logic 629. Control logic 629 then determines if the current cycle can be merged with an existing buffered cycle, and if so, generates a COMP BUFF0 or COMP BUFF1 for merging data in the matching buffer. In the event of a non-match, control logic 629 also determines the overall sequence of cycle operation to the memory controller. Control logic 629 controls multiplexer 634 by a control signal on a tristate line 625 in order to present the correct cycle information on bus 432.

Logic 629 has a number of additional inputs and outputs connected to various lines upon which different signals are transmitted. Such lines and signals are as follows. Address lines 422 supply CPU address signals CPUADDR and CPU byte enable signals (CPUBE$). Control lines 424 carry control signals bidirectionally. Lines 520 and 623 respectively transmit a latch BUFF0 and a latch BUFF1 respectively to BUFF0 and BUFF1 respectively for controlling the latching thereof. Lines 525 and 620 respectively transmit COMPRESS BUFF0 and COMPRESS BUFF1 to buffers 630 and 631. Line 626 transmits control information between logic 629 and the memory controller by bus 432, including signals BADS$ and SRDY$.

A processor bus cycle is the basic way to transfer information either from the processor to the memory (a write cycle) or from the memory to the processor (read cycle). Since read cycles are not compressed, the remaining description is limited to write operations which are described with reference to the various timing diagrams and to FIG. 5. Many of the various signals are identified by signal names some of which have a suffix symbol $ that indicates such signal is active or asserted when the signal is at a low voltage. When no $ is present, the signal is asserted at a high voltage level.

Figure 6:
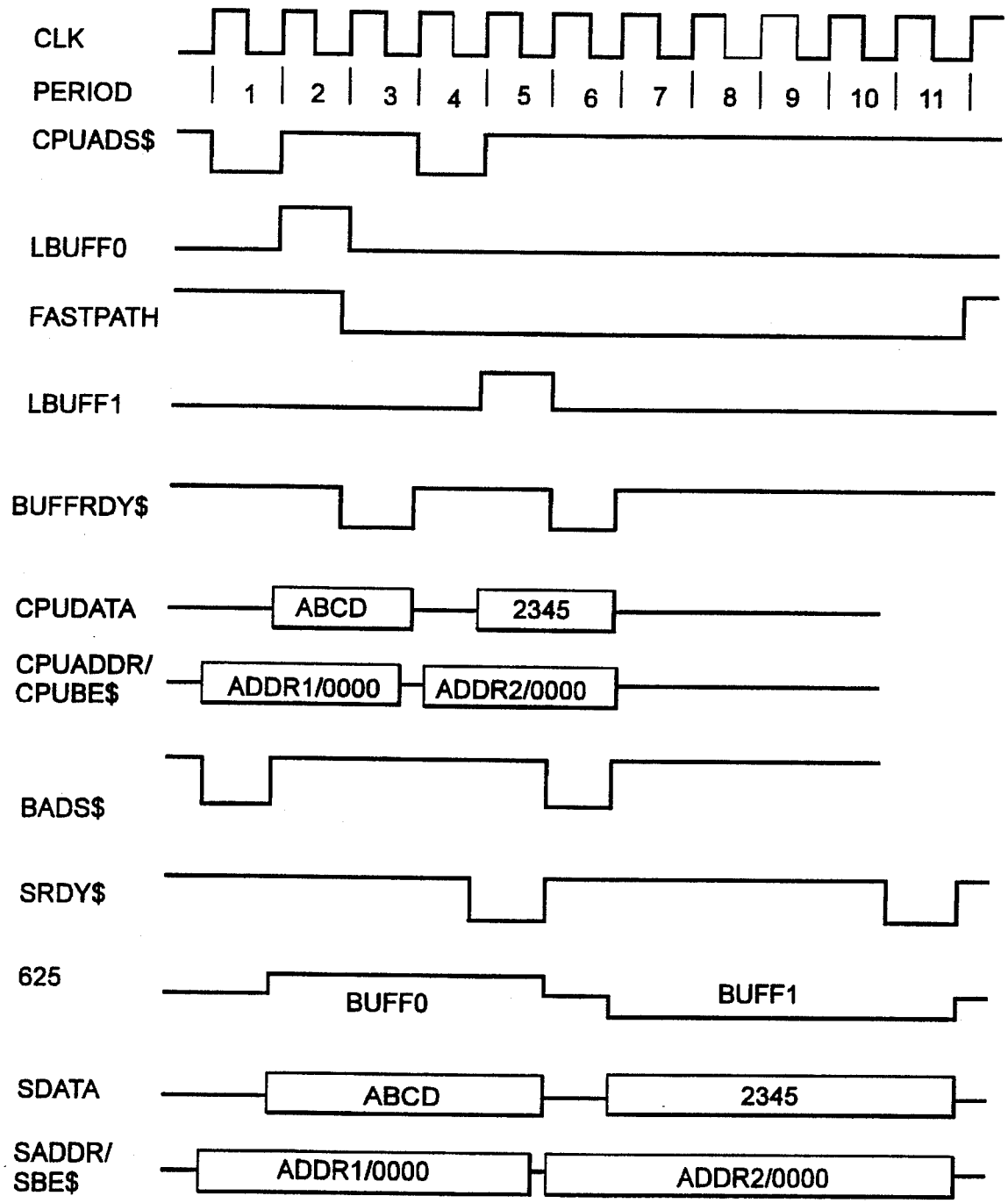
FIG. 6 is a timing diagram showing an example of a double word write cycle buffer operation.
Figure 7:
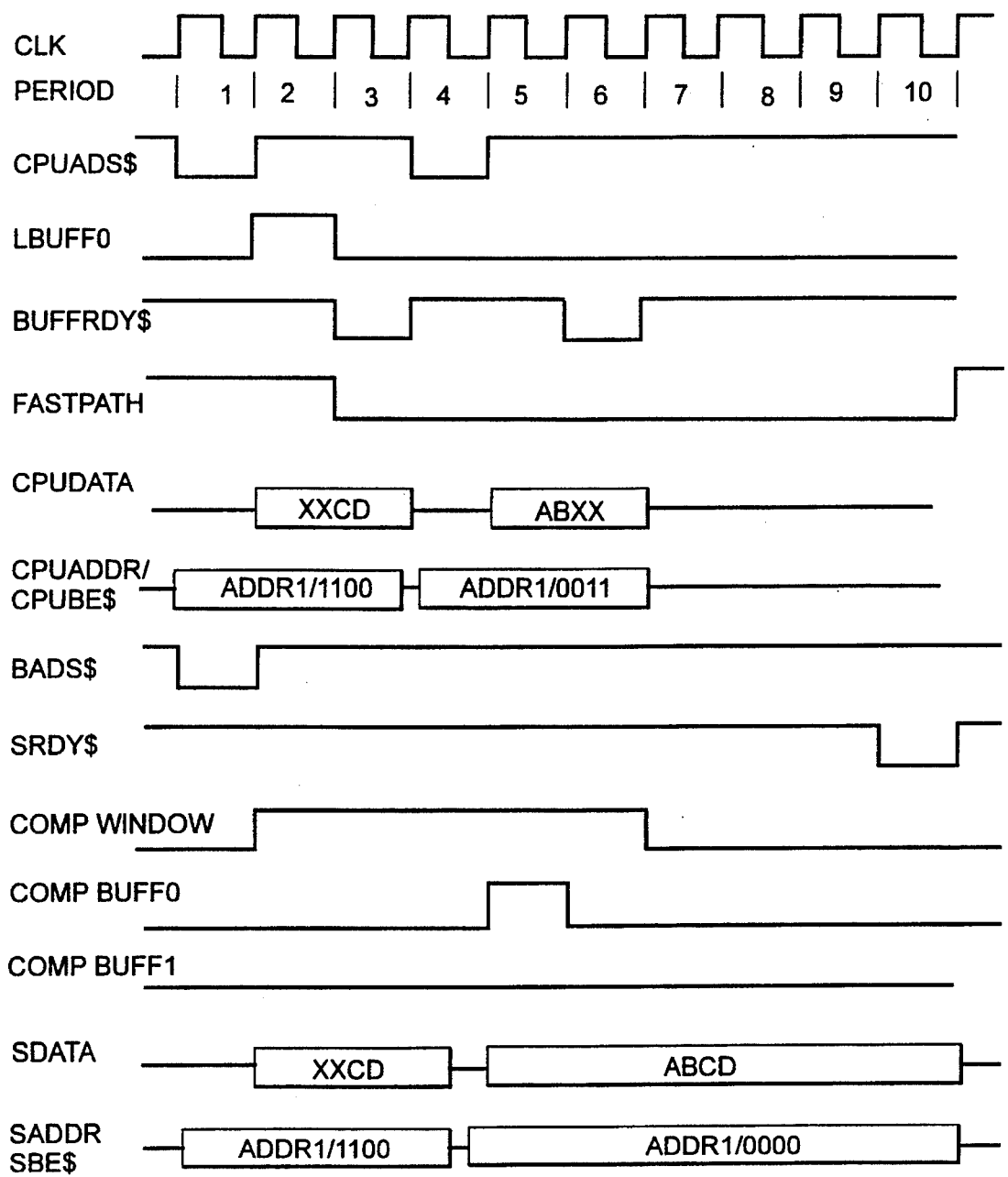
FIG. 7 is a timing diagram showing an example of a compression write buffer cycle.
Figure 8:
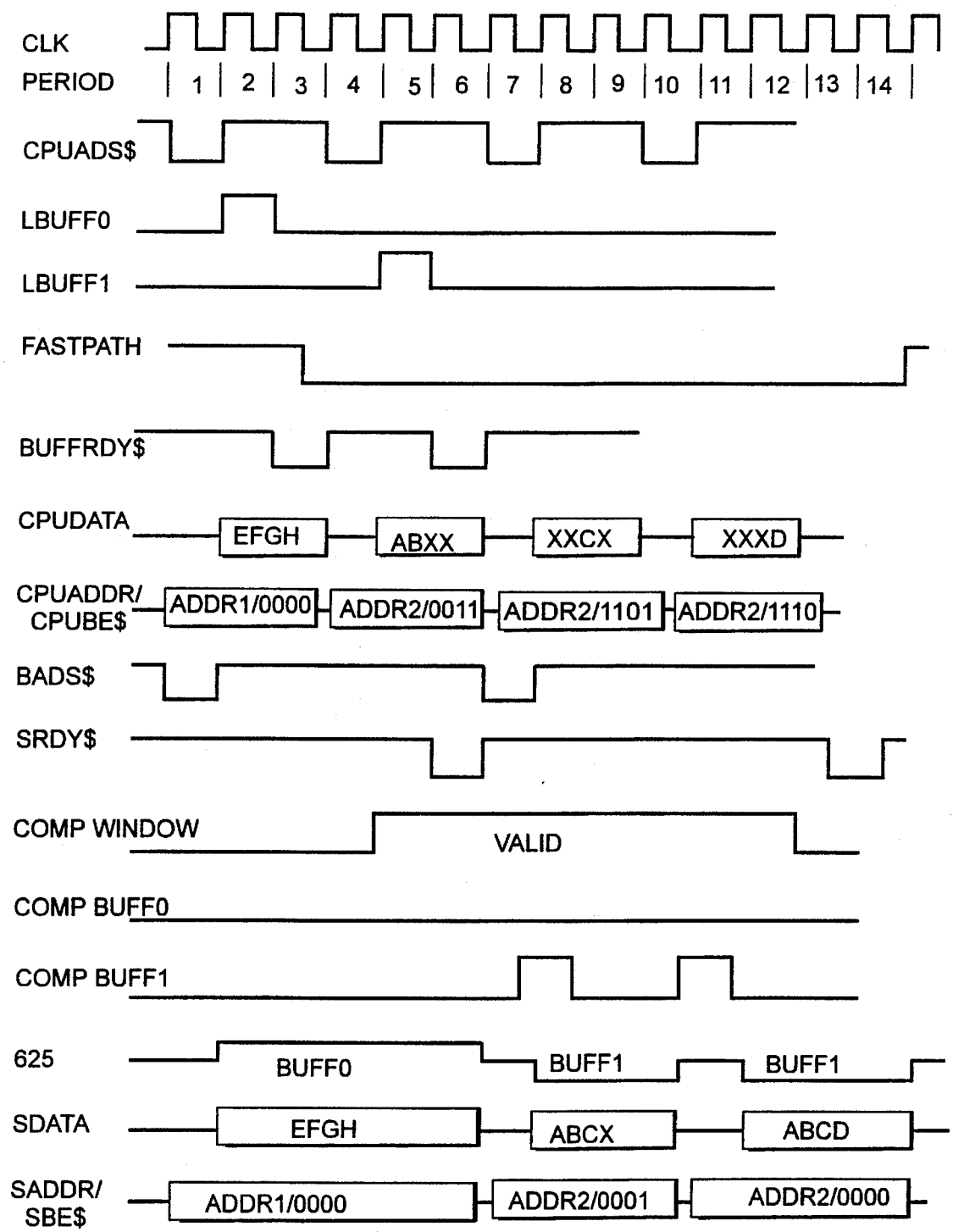
FIG. 8 is a timing diagram showing another example of a compression write buffer cycle.

FIGS. 6–8 illustrate three examples of different types of consecutive bus cycles and how the invention operates in conjunction therewith. Bus cycles are timed in accordance with processor clock periods defined by a clock signal CLK. Bus cycles are initiated in standard fashion by the assertion of an address status signal and end with the assertion of an acknowledgement signal. The type of cycle is determined by the bus definition signals and the byte enable signals. FIG. 6 shows the principal signals that occur when the processor initiates two successive, doubleword write operations during which buffering occurs but no compression takes place because doubleword write cycles are not partial write cycles. This example also assumes at the start that memory controller 256 is not busy and that both buffers 630 and 631 are idle or empty.

To start a local bus write cycle, processor 202 asserts address status signal CPUADS$ concurrently with asserting the address signals CPUADDR and CPUBE$ and standard bus definition signals (not shown) M/IO$, W/RS, and D/CS, on bus 418. Logic 629 is connected to local bus 418 as previously indicated and monitors the signals on the bus. In response to receiving and detecting the CPUADS$ signal in period 1, logic 629 determines from the bus definition signals that a memory write cycle has begun. The byte enable signals CPUMBE$ indicate which data bytes of the data bus are being transferred and thus define whether a cycle is a partial write cycle or a full write cycle. Since the example is a double word transfer, the CPUMBE$ are all "0"s. In period 2, the data CPUDATA to be written into memory is placed on bus 418 for two periods. The first double word data example is expressed in hexadecimal notation as "ABCD" and the second double word data example is "2345". Logic 629 further determines from the byte enable signals that a doubleword write operation is occurring and therefore no compression need be done. Logic 629 in response to detecting a write cycle asserts the LATCH BUFF0 control signal at the beginning of the second period causing the data signals from bus 418 to be latched in BUFF0. At the end of period 2, logic 629 then transmits an acknowledgement signal BUFFRDY$ over bus 424 to processor 202 to signal the processor that the first write cycle has been completed so far as the processor is concerned. As a result of having received such acknowledgement signal, the processor is then free to initiate another bus cycle which it immediately does by sending a second address status signal CPUADS$ at the start of period 4 to initiate a consecutive second local bus write cycle. During this second double word write operation, a double word "2345" is placed on the data bus along with the appropriate CPUBE$ signals. Since BUFF0 is busy at such time and BUFF1 is idle, logic 629 asserts a LBUFF1 signal to latch the second data item in BUFF1 and BUFFRDY$ is again asserted in period 6 to signify completion of the second local bus write cycle to the processor.

The preceding paragraph describes the sequence of signals between the processor and compression write buffer 410, and some of the signals used internally in the buffer. It should be noted that relative to the processor, a full word write cycle requires three clock periods. The following description describes the sequence of events and signals occurring between buffer 410 and memory controller 256. A memory controller bus cycle is initiated by a SADS$ signal and ends with a SRDY$ acknowledgement signal and is slower than a processor bus cycle and requires five clock periods for a non-partial (full) write cycle. In response to receiving the CPUADS$ signal in period 1, logic 629 asserts an address status signal BADS$ on one of control lines 626 along with related bus definition signals to initiate a double word write bus cycle to the controller. Line 625 is a tristate line and logic 629 asserts a first signal on line 625 to effectively connect BUFF0 to bus 432 through MUX 634 whereby the data signals in BUFF0 are placed on the data lines of bus 432 as the SDATA signals representing "ABCD" for three periods and the address signals in BUFF0 are placed on the address lines of bus 432 as SADDR and SBE$. In response to receiving the write request signals, controller 256 causes the data SDATA to be written into the memory at the address specified by SADDR. Controller 256 then asserts an acknowledgement signal SRDY$ in period 5 informing logic 629 of the completion of the memory writing operation. In period 6, logic 629 is then free to assert a second address status signal BADS$ and related signals causing controller to start the second double word write cycle. During the course of the second cycle, MUX 634 is switched by a control signal on line 625 to connect BUFF1 to bus 432 causing the SDATA, SADDR and SBE$ signals latched in BUFF1 to be placed on bus 432. Upon completion of the second write cycle, the controller then asserts the second SRDY$ signal in period 11.

The FASTPATH signal is driven active by logic 629 during periods 1 and 2 when comparator 633 is idle, and is driven inactive during period 3 after the LBUFF0 signal is activated. During the active FASTPATH periods, the SADDR/SBE$ signals are propagated with minimal delay from bus 418 through BUFF0 (BUFF1) onto bus 523 and then onto bus 432. This allows memory control unit 256 to get the earliest possible indication of the current bus cycle as issued by CPU 202. FASTPATH is driven inactive in period 3. During the inactive periods, the signals sent to the controller eminate from the data, address, and control buffers in BUFF0 and from logic 629. FASTPATH is switched back to the active state at period 12, the clock period after memory controller 256 has indicated the completion of the last buffered cycle via SRDY$.

FIG. 7 illustrates an example of two successive partial write cycles to the same memory address ADDR1, with cycle compression. Assume at the start the buffers are empty and the controller is not busy. A first partial write cycle is initiated by the processor asserting the CPUADS$, CPUADDR and CPUBE$ signals in period 1 followed by CPUDATA in period 2. The data to be written into memory by the first cycle is a single word "CD" at the low end of a double word data bus where the high word is represented as "XX". That is, relative to the data bus, the single word is transferred as "XXCD". The byte enable signals "1100" identify which bytes are active and to be written wherein a "0" identifies an active byte and a "1" identifies an inactive byte. In response to detecting the bus cycle being initiated is a write cycle, a latch signal LBUFF0 is asserted in period 2 causing the signals on bus 418 to be latched in BUFF0, and the BUFFRDY$ signal is asserted in period 3 freeing the processor to initiate another cycle which it does by asserting CPUADS$ CPUADDR and CPUBE$ in period 4 and CPUDATA in period 5. A BADS$ signal is sent in period 1 causing the controller to start a partial write bus cycle.

In response to determining from the byte enable signals that the write cycle being commenced is a partial write cycle, logic 629 asserts a valid compression window signal COMP WINDOW to enable compression to take place on subsequent cycles. As indicated previously, a partial write operation causes the memory controller to perform a read-modify-write (RMW) cycle and the read portion is initiated during the first period (period 2) of the valid compression window. A RMW requires three events, the first to read, the second to modify and the third to write. The latched data and byte enable signals are asserted on bus 432 during periods 2–4. At the start of period 4, the second partial write cycle to the same address ADDR1 is initiated by the processor and in response to recognizing that compression can occur, a control signal COMP BUFF0 is asserted in period 5 concurrently with assertion of the second set of CPUDATA and CPUBE$ signals whereby the second word "ABXX" is merged in BUFF0 with the previous word to form a double word "ABCD". The byte enable signals are also merged or changed to "0000" to reflect the byte status of the latched data. A SRDY$ signal is asserted in period 10 upon completion of the compression write cycle. The first cycle ends relative to the processor in the same fashion as the buffered write in FIG. 6, i.e., using BUFFRDY$ in period 3. Controller 629 uses the second CPUADS$ signal during period 4 to start the second cycle which gets compressed into the first. Since the second CPUADS$ signal is seen active by the controller 629 at the same time that COMP WINDOW is active, control logic 629 is able to compress the two cycles providing the addresses match. Note that the COMP WINDOW signal occurs normally during the read portion of a partial write cycle. While such read portion is in progress, controller 256 allows write data and byte enable signals to change, into the new compressed values. The COMP BUFF0 signal is generated in response to comparator 633 detecting that the address signals in the second cycle are to the same address as is latched in the address buffer of BUFF0 and generating a MATCH 0 signal as previously described.

FIG. 8 provides an example of successive cycles where the first is a full write cycle followed by three consecutive partial writes to the same address, the three partial writes being compressed into one memory write operation. The partial writes are for a single word "AB" and then for different bytes "C" and "D". The double word write operation occurs as described previously relative to the example of FIG. 6. The control signal on line 625 connects BUFF0 to bus 432 and the word is written in memory whereupon the controller returns the acknowledge signal SRDY$ in period 6. The processor initiates the first partial write cycle in period 4 and because BUFF0 is busy, a LBUFF1 signal is asserted in period 5 causing "ABXX" to be latched in BUFF1. The remaining partial write cycles are initiated in periods 7 and 10 by the CPUADS$ signals. In period 8, a COMP BUFF1 signal is asserted causing byte "C" to be merged in BUFF1 with "ABXX" therein to form "ABCX".

In period 6, an acknowledgement signal SRDY$ is received allowing logic 629 to send a BADS$ signal to the controller in period 7 to initiate a second partial write cycle that corresponds to the CPUADS$ in period 4, during which 625 is switched to connect BUFF1 to bus 432 and place "ABCX" on the bus. However, before that cycle can be completed, the third partial write is initiated to the same address for byte "D" and the write portion of the RMW cycle is further modified as a result of the COMP BUFF1 signal. In period 10, a second COMP BUFF1 signal is asserted causing byte "D" to be merged in BUFF1 to form double word "ABCD" therein. This double word is placed on bus 432 in cycle 11 and the controller then writes it into memory and sends a SRDY$ at the end. Thus, the three partial write cycles are compressed into a single, double word memory write cycle.

The invention may be embodied in a VLSI device that includes 410, 256, 402, 404, 220 and 414. Such integration allows greater flexibility in the type of signals passed between 410 and 256 particularly as such signals relates to the COMP WINDOW signal. In the invention, the COMP WINDOW signal goes active a) during the read portion of a RMW cycle (ECC only), b) during periods when one of the buffers (BUFF0 or BUFF1) is busy with a write cycle to controller 256 while the non-busy buffer is available for compression (ECC or parity memory mode), and c) during periods when a dual port memory controller 256 is busy servicing the non-CPU port (bus 434) (ECC or parity memory mode).

It should be apparent to those skilled in the art that many changes can be made in the details and arrangements of steps and parts without departing from the scope of the Invention as defined in the appended claims.

What is claimed is:

1. In a personal computer having a memory, a memory controller connected to said memory for controlling operation thereof, a memory controller bus connected said memory controller, a local bus, and a processor connected to said local bus, said processor being operative to initiate first and second partial write cycle requests on consecutive local bus cycles, said first partial write cycle request specifying first data to be written in said memory at a first address, said second partial write cycle request specifying second data to be written in said memory at said first address, the improvement comprising:

a. a partial write cycle compression write buffer connected to said local bus and said memory controller bus, said write buffer comprising first buffer means connected to said local bus and comprising:
      i. first data buffer for receiving and buffering data from said local bus to be written into said memory at a first address,
      ii. first address buffer for storing said first address,
      iii. control logic operable in response to receiving said first and said second partial write requests on said local bus to acknowledge to said processor completion of local bus cycles before said data has been written into said memory, and to compress said first and said second partial write cycles into a single memory controller bus write cycle for simultaneously writing said first data and said second data in said memory;
   b. said memory controller operates said memory during a partial write cycle and perform a read-modify-write operation, and said memory controller is operative to modify data read from said memory and write said first data and said second data into said memory;
   c. said processor is operative to assert a third write request on said local bus before completion of said single memory controller write bus cycle, said third write request being to write data into said memory at a second address different than said first address, said computer further comprising:
      second buffer means connected to said local bus in parallel with said first buffer means, said second buffer means being selectively operable to receive and buffer data and address from said third write request pending completion of said single memory controller write bus cycle.

2. A personal computer in accordance with claim 1 wherein
   said control logic being further operable in response to completion of said single memory controller write bus cycle to initiate a second memory controller bus write cycle to write said data buffer in said second buffer means in said memory at said address in said second buffer means.

3. A personal computer in accordance with claim 3 wherein:

said local bus, said first data buffer, said memory controller bus, and said memory have a plural byte data path width;
   each address includes a plurality of byte enable signals identifying which data bytes are being written with each partial write cycle request;
   and said control logic operates in response to said byte enable signals to merge said second data with said first data.

4. A computer in accordance with claim 1 wherein:
   said partial write cycle compression buffer further comprises a comparator for comparing an address on said local bus with an address in said first address buffer and generating a MATCH signal when such two addresses are the same;
   and said control logic is operable in response to said MATCH signal to generate a COMP BUFF signal and transmit such signal to said first buffer means to gate said second data from said local bus into said first data buffer.

5. A computer in accordance with claim 1 wherein:
   said control logic is operative to compress said first and second partial write cycles by first initiating a memory controller bus partial write cycle in response to receiving said first partial write request to thereby initiate said read-modify-write operation, and by thereafter merging said first data and said second data and modifying data read from said memory in accordance with such merged data.

6. A computer in accordance with claim 5 comprising:
   bypass means connected to said control logic, said local bus and said memory controller bus, said bypass means being operative in response to said first partial request to propagate signals from said local bus to said memory controller bus and initiate said memory controller partial write cycle.

7. A computer in accordance with claim 6 wherein:
   said bypass means comprises a multiplexer having a first input connected to said first buffer means, a second input connected to said local bus, an output connected to said memory controller bus, and a control input connected to said control logic for receiving a FASTPATH control signal which controls which input is connected to said output of said multiplexer;
   said control logic being operative to generate an active FASTPATH signal while receiving said first partial write request and to generate an inactive FASTPATH signal until completion of said memory controller bus write cycle, said local bus being connected to said memory controller bus through said multiplexer when said FASTPATH signal is active, and said first buffer means being connected to said memory controller bus when said FASTPATH signal is inactive.

8. A computer in accordance with claim 5 comprising:
   error correction code means connected to said memory and operative during said read-modify-write operation of said memory to calculate a new correction code and write it into said memory along with said first data and said second data.

9. A personal computer in accordance with claim 1 wherein:
   said memory is a dual port controller having one port connected to said memory bus controller and a second port operable to receive a third memory request whereby said memory may be busy servicing said third request when said first and second partial write requests are received by said first buffer means;

and said control logic is operable to delay compression of said first and second partial write cycles until after said third request has been serviced.

10. A personal computer in accordance with claim 1 wherein said first and second partial write requests are made on consecutive bus cycles.

11. In a personal computer having a memory for storing information at a plurality of addressable locations, each location including at least four bytes of information, a memory controller connected to said memory for controlling operation thereof, a memory controller bus connected to said memory controller, a local bus including a local address bus, a local control bus, and a local data bus having a width of at least four bytes for transferring from one to four bytes of information on each write cycle, and a processor connected to said local bus, said processor being operative to initiate first and second partial write cycle requests on consecutive local bus cycles, said first partial write cycle request specifying first data to be written in said memory at a first address, said second partial write cycle request specifying second data to be written in said memory at said first address, said first data having one or two bytes and said second data having one or two bytes, said processor asserting on said local address bus in each partial write request byte enable signals defining each byte being transferred, the improvement comprising:

a. a partial write cycle compression write buffer connected to said local bus and said memory controller bus, comprising first buffer means connected to said local bus and comprising:

i. first data buffer connected to said local data bus for selectively receiving and buffering said first data in response to a LATCH signal, and for merging said second data with said first data buffer in said first data buffer, in response to a COMP BUFF control signal, ii. a first address buffer connected to said local address bus for storing said first address for selectively receiving and buffering said first memory address and said byte enable signals;

a comparator connected to said local address bus and to said first address buffer and being operative to compare the address buffer in said first address buffer with the address on said local bus in said second partial write cycle request and generating a MATCH signal when the two addresses being compared are the same;

a control logic connected to said first buffer means, to said local bus, and to said memory controller bus, said control logic being operable to i. generate said LATCH signal in response to said first partial write request, ii. generate said COMP buff signal in response to said MATCH signal, iii. transmit to said processor acknowledgment signals after data from each request has been stored in said first data buffer, which acknowledgement signals indicate to said processor that each of said first and second requests has been completed, before said first data and said second data have been written into said memory, and iv. compress said first and said second partial write cycles into a single memory controller bus write cycle for simultaneously writing said first and second data in said memory;

b. said memory controller operates said memory during a partial write cycle and perform a read-modify-write operation, and said memory controller is operative to modify data read from said memory and write said first data and said second data into said memory;

c. said processor is operative to assert a third write request on said local bus before completion of said single memory controller write bus cycle, said third write request being to write data into said memory at a second address different than said first address, said computer further comprising:

second buffer means connected to said local bus in parallel with said first buffer means, said second buffer means being selectively operable to receive and buffer data and address from said third write request pending completion of said single memory controller write bus cycle.

12. A personal computer in accordance with claim 11 wherein said control logic being further operable in response to completion of said single memory controller write bus cycle to initiate a second memory controller bus write cycle to write said data buffer in said second buffer means in said memory at said address in said second buffer means.

13. A computer in accordance with claim 11 wherein:

said partial write cycle compression buffer further comprises a comparator for comparing an address on said local bus with an address in said first address buffer and generating a MATCH signal when such two addresses are the same;

and said control logic is operable in response to said MATCH signal to generate a COMP BUFF signal and transmit such signal to said first buffer means to gate said second data from said local bus into said first data buffer.

14. A computer in accordance with claim 13 wherein:

said control logic is operative to compress said first and second partial write cycles by first initiating a memory controller bus partial write cycle in response to receiving said first partial write request to thereby initiate said read-modify-write operation, and by thereafter merging said first data and said second data and modifying data read from said memory in accordance with such merged data.

15. A computer in accordance with claim 14 comprising:

bypass means connected to said control logic, said local bus and said memory controller bus; said bypass means being operative in response to said first partial request to propagate signals from said local bus to said memory controller bus and initiate said memory controller partial write cycle.

16. A computer in accordance with claim 15 wherein:

said bypass means comprises a multiplexer having a first input connected to said first buffer means, a second input connected to said local bus, an output connected to said memory controller bus, and a control input connected to said control logic for receiving a FASTPATH control signal which controls which input is connected to said output of said multiplexer;

said control logic being operative to generate an active FASTPATH signal while receiving said first partial write request and to generate an inactive FASTPATH signal until completion of said memory controller bus write cycle, said local bus being connected to said memory controller bus through said multiplexer when said FASTPATH signal is active, and said first buffer means being connected to said memory controller bus when said FASTPATH signal is inactive.

17. A computer in accordance with claim 16 comprising:

error correction code means connected to said memory and operative during said read-modify-write operation of said memory to calculate a new correction code and write it into said memory along with said first data and said second data.

* * * * *